Dec. 10, 1968  TADAO MURAKAMI  3,416,016
SPEED REDUCTION APPARATUS FOR AUTOMOTIVE VEHICLES
Filed Jan. 4, 1966  6 Sheets-Sheet 1

INVENTOR
TADAO MURAKAMI

BY Paul M. Craig, Jr.
ATTORNEY

Dec. 10, 1968  TADAO MURAKAMI  3,416,016
SPEED REDUCTION APPARATUS FOR AUTOMOTIVE VEHICLES
Filed Jan. 4, 1966  6 Sheets-Sheet 5

FIG. 9

INVENTOR
TADAO MURAKAMI

BY Paul M. Craig, Jr.
ATTORNEY

FIG. 14 ly # United States Patent Office 3,416,016
Patented Dec. 10, 1968

3,416,016
SPEED REDUCTION APPARATUS FOR
AUTOMOTIVE VEHICLES
Tadao Murakami, Hitachi-shi, Japan, assignor to Hitachi,
Ltd., Tokyo, Japan, a corporation of Japan
Filed Jan. 4, 1966, Ser. No. 518,602
Claims priority, application Japan, Jan. 11, 1965,
40/978
4 Claims. (Cl. 310—93)

This invention relates to a novel type of speed reduction apparatus for use with automotive vehicles.

In a mountainous district or the like, there are many cases that automotive vehicles must go down a long downward slope of steep incline. In such a case, the driver manoeuvres the vehicle while imparting an engine brake action thereto and actuates the foot brake as required. Utilization of the engine brake is indispensable in such case in order to prevent excessive wear and heating of brake drums and brake linings resulting from a long braking action solely by the foot brake, and to enhance the safety of drive by reducing the frequency of foot brake actuation during the drive to thereby minimize the fatigue of the driver. This engine brake can effectively and economically be attained by closing the throttle valve and completely interrupting fuel supply to the engine. When however the engine is made to continuously rotate in its idling state with the fuel supply completely shut off, the temperature of the engine would be gradually reduced to an extent that the engine cannot satisfactorily be started even though fuel is again supplied thereto as soon as the vehicle reaches a flat road.

With such prior defect in mind, the present invention contemplates interposition of a speed reduction apparatus in the drive system of an automotive vehicle to deal with the case in which the vehicle goes down a long downward slope of steep incline so as to impart a suitable braking force to the drive system, to reduce wear of brake drums and brake linings frequently actuated by the foot brake pedal, to prevent supercooling of the engine, to reduce the frequency of actuation of the foot brake for thereby insuring the safety of the drive and avoiding any fatigue of the driver, and to provide effective braking means which controls the speed of the vehicle at a predetermined desired value regardless of any downward slope of whatever incline on which the vehicle must travel.

It is an object of the present invention to provide a speed reduction apparatus for automotive vehicles comprising an outer casing secured to a stationary portion of the vehicle body, a rotary shaft extending through said casing and connected with the propeller shaft of the vehicle, a rotor mounted on said rotary shaft for unitary rotation therewith and having exciting coils of braking means and power generating coils of an AC generator fixedly mounted thereon, said AC generator having its field coils disposed opposite said power generating coils on said rotor, a stator disposed in said casing in a manner to be concentrically opposed in suitably spaced relation by said rotor and said casing so that magnetomotive force generated in said exciting coils of said braking means can produce an eddy current on that face portion of said stator which is opposite to said rotor, means for connecting said field coils of said AC generator to a battery through switch means, and means for connecting the output terminals of said power generating coils of said AC generator to said exciting coils of said braking means through rectifier means, whereby to supply a large current required by said exciting coils of said braking means from said AC generator, to minimize the power to be supplied from the battery, to reduce power consumption of the battery, to decrease the amount of flow of current through said switch means, to make said switch means small-sized and to prevent any damage on the contacts of said switch means due to large current flow thereacross.

A further object of the present invention is to provide a speed reduction apparatus for automotive vehicles comprising an outer casing secured to a stationary portion of the vehicle body, a rotary shaft extending through said casing and connected with the propeller shaft of the vehicle, a rotor mounted on said rotary shaft for unitary rotation therewith and having exciting coils of braking means and power generating coils of an AC generator fixedly mounted thereon, said AC generator having its field coils disposed opposite said power generating coils on said rotor, a stator disposed in said casing in a manner to be concentrically opposed in suitably spaced relation by said rotor and said casing so that magnetomotive force generated in said exciting coils of said braking means can produce an eddy current on that face portion of said stator which is opposite to said rotor, an auxiliary generator for speed detection whose output is variable in proportion to vehicle speed, automatic control means including a plurality of transistors whose conducting state is controlled by the output of said auxiliary generator, means for connecting said field coils of said AC generator to a battery through the collector circuit of said transistors in said automatic control means, and means for connecting the output terminals of said power generating coils of said AC generator to said exciting coils of said braking means through rectifier means, whereby to cause the field current of said AC generator to increase in proportion to vehicle speed, to automatically increase the amount of power generated by said AC generator to thereby obtain a satisfactory braking action by said braking means, and to smoothly control the field current of said AC generator in multiple stages.

Another object of the present invention is to provide a speed reduction apparatus of the type described above, in which the output of the AC generator corresponding to its rotating speed is effectively utilized for the excitation of the braking means for thereby minimizing the exciting power to be externally supplied to the speed reduction apparatus, and the output of the AC generator which is mounted on the same rotor with the exciting coils and whose rotating speed increases with the increase in the vehicle speed is utilized to compensate for any reduction in the exciting current and the braking torque in inversely proportion to an increase in the resistance of the exciting coils due to a temperature rise during a long time drive for thereby preventing any reduction in the exciting current and the braking torque.

Still another object of the present invention is to provide a speed reduction apparatus of the type described above, in which the stator surrounding the rotor having the exciting coils of the braking means mounted thereon is so mounted in the casing that one of its axial ends is fixed to the casing and the other axial end is arranged to be slidable along the inside face of the casing, and in which O-rings are disposed in the annular space portions between the casing and the opposite axial end portions of the stator to seal the axial ends of the above space portions, whereby to permit admission of a cooling liquid into the space between the casing and the stator, to avoid any breakage of the stator resulting from axial and radial deformation of the stator due to a temperature rise, and to prevent leakage of the cooling liquid through the stator.

The above and other objects, advantages and features of the present invention will become more apparent from the following description with reference to the accompanying drawings, in which.

Figure 1:
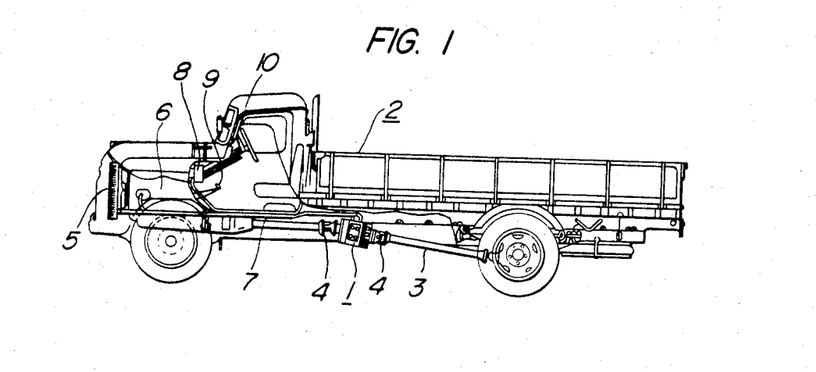
FIG. 1 is a partly cutaway side elevational view of an automotive vehicle equipped with the speed reduction apparatus according to the present invention.

Referring to FIG. 1, the speed reduction apparatus according to the present invention is generally designated by reference numeral 1 and is shown as interposed in a propeller shaft 3 of an automotive vehicle 2 through universal joints 4. A radiator 5 supplies a cooling liquid to an engine 6 and the speed reduction apparatus 1 by way of a circulating conduit 7. The speed reduction apparatus 1 is operatively associated with an automatic control means 8 which is electrically connected with a foot brake pedal 9 and a manual control switch 10.

Figure 2:
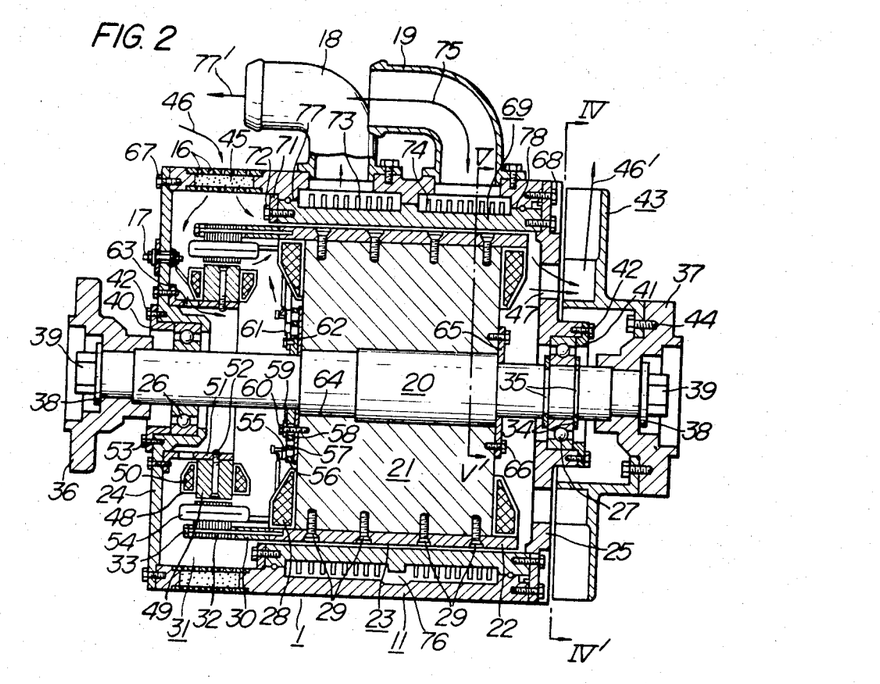
FIG. 2 is a fragmentarily axial sectional front elevational view of an embodiment of the apparatus according to the invention.
Figures 3, 4, 5:
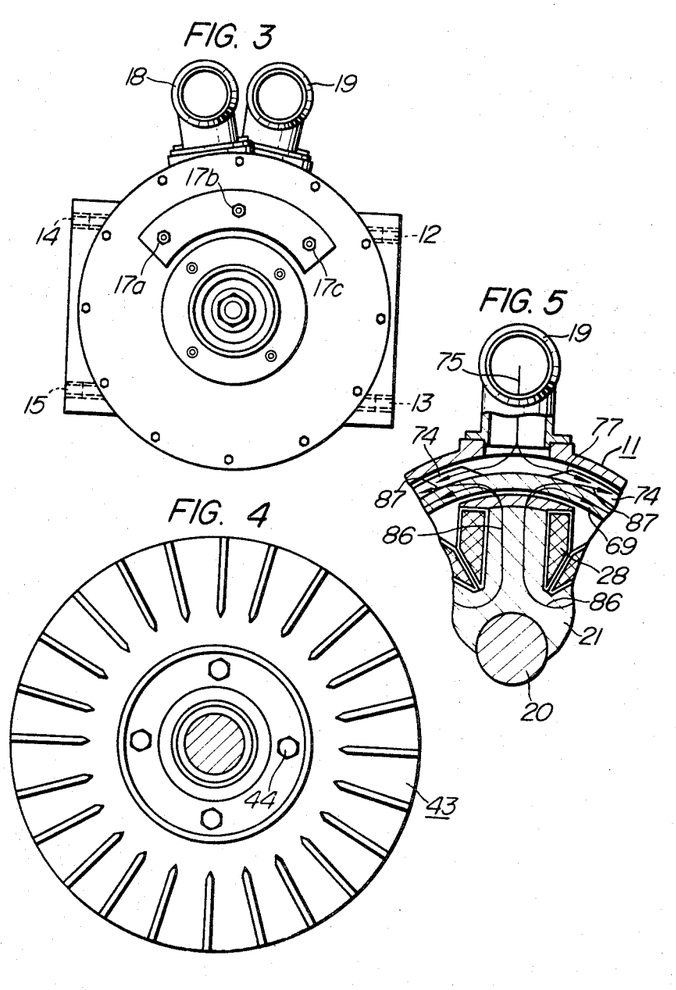
FIG. 3 is a side view of the apparatus of FIG. 2.
FIG. 4 is a sectional view taken on the line IV–IV' in FIG. 2.
FIG. 5 is a sectional view taken on the line V–V in FIG. 2.

The structure of the speed reduction apparatus 1 will be described in detail with reference to FIG. 2. The speed reduction apparatus 1 includes an outer casing 11 which is firmly secured to a stationary part of the vehicle body by screws 12, 13 14 and 15 as shown in FIG. 3. A terminal assembly 17 consists of terminals 17a, 17b and 17c for controlling the braking torque. An inlet 19 and an outlet 18 of the cooling liquid circulated through the cooling system are provided on the casing 11. A rotary shaft 20 carrying thereon a rotor 23 consisting of magnetic poles 21 and pole pieces 22 is rotatably journalled at parts adjacent its opposite ends in bearings 26 and 27 mounted in respective end brackets 24 and 25. Exciting coils 28 are wound about the magnetic poles 21 and are secured in place when the pole pieces 22 are fastened to the magnetic poles 21 by means of screws 29. An armature 32 of an AC generator 31 is firmly secured to the magnetic poles 22 by bolts 33 through distant pieces or spacers 30 of non-magnetic material interposed therebetween. Fixing of the rotary shaft 20 in its axial direction to prevent any axial displacement thereof is attained by means of snap rings 34 received in grooves 35 on the shaft 20, and couplings 36 and 37 are fitted on the opposite ends of the rotary shaft 20 and are fixed to the shaft 20 by nuts 39 with washers 38 interposed therebetween. The bearings 26 and 27 are securely mounted in the end blocks 24 and 25 by bearing holders 40 and 41 which are fastened to the end blocks 24 and 25 by bolts 42, respectively.

A cooling fan 43 of a shape as shown in FIG. 4 is secured to the coupling 37 by bolts 44 and rotates unitarily with the rotary shaft 20. As the cooling fan 43 rotates, an air stream 46 is inhaled through an air filter 45 fitted in an opening 16 bored through the casing 11 to be conducted in a direction as shown by arrow and is then passed through air passages 47 bored through the end bracket 25 to be finally discharged outwardly of the casing 11 by the cooling fan 43 in a manner as shown by arrow 46'.

A field system 48 of the AC generator 31 includes field coils 50 wound about magnetic poles 49. The magnetic poles 49 are mounted on a magnetic pole holder 51 by screws 52, and the pole holder 51 is in turn fixed to the end bracket 24 by bolts 53. Power generating coils 54 for inducing an AC voltage are wound about the armature 32 of the AC generator 31, and output terminals of the power generating coils 54 are connected to a semiconductor rectifier means 55 coaxially rotating with the armature 32 so that the AC voltage output can be subject to full-wave rectification. The above-described semiconductor rectifier means 55 is mounted in a rectifier holder 56 which is firmly secured to the magnetic poles 21 by bolts 60 through plates 57, tubes 58 and washers 59 of electrically insulating material. A terminal 61 of the rectifier means 55 is fixed to the rectifier holder 56 by a bolt 62 and is connected with the exciting coils 28 of the speed reduction apparatus 1. A plurality of air passage openings 63 are provided on the magnetic pole holder 51 so that a portion of the cooling air stream 46 is allowed to pass through these openings 63 to cool the rectifier means 55, the exciting coils 28 and the field coils 50 of the AC generator 31. The magnetic poles 21 have a portion thereof engaged with an engaging portion 64 provided on the rotary shaft 20 and have one end thereof fixed to a plate 65 by bolts 66 so as to be fixed in position on the rotary shaft 20. The end brackets 24 and 25 are firmly fixed to the casing 11 by bolts 67 and 68, respectively.

Reference numeral 69 denotes a stator for generating an eddy current for thereby converting mechanical energy into thermal energy. The stator 69 has its one end fixed to the end bracket 25 by bolts 70 and has the other end thereof fitted by bolts 72 to a conductive ring 71 which is slidable along the inner face of the casing 11. A plurality of cooling fins 73 and 74 extend radially from the outer peripheral face of the stator 69. In order to reduce the resistance against the flow of the cooling liquid which is admitted into the liquid inlet 19 as shown by arrow 75 and is discharged from the liquid outlet 18 as shown by arrow 77', those portions of the cooling fins 74 and 73 adjacent the liquid inlet 19 and the liquid outlet 18 are cut out as at 77 as best shown in FIG. 5. Similar cutouts 77 are also provided at those portions of the cooling fins 73 and 74 adjacent a communication passage 76 at the lower part of the stator 69 so that the cooling liquid admitted from the inlet 19 can smoothly flow through the cooling fins 74, the communication passage 76 and the cooling fins 73 to be discharged out of the outlet 18.

Figure 6:
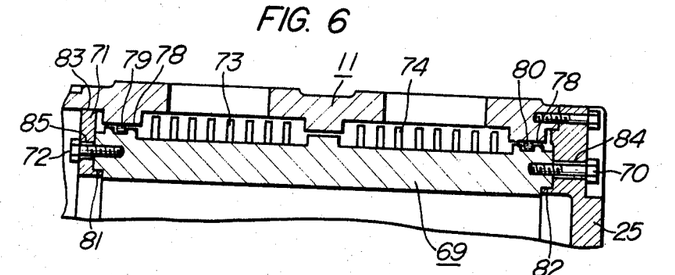
FIG. 6 is an enlarged view of part of the apparatus of FIG. 2, the view showing a part of a cooling system incorporated in the apparatus.

The thermal energy produced in the stator 69 is transmitted to the cooling liquid and is thus carried away from the apparatus from the liquid outlet 18 by the liquid. However, the heat produced in the stator 69 is so great that this stator 69 may be heated to a high temperature and may have its outside diameter enlarged due to thermal expansion thereof. Therefore the casing 11 may be destroyed in a worst case due to stress imparted thereto if a clearance 78 between the stator 69 and the casing 11 is small. O-rings 79 and 80 are provided in the clearance 78 at portions near the opposite ends of the stator 69 as best shown in FIG. 6 so that an excessive stress may not be imparted to the casing 69. The clearance 78 may be narrowed as the stator 69 expands due to thermal expansion, but an arrangement is made so that the clearance 78 may not become zero even when the maximum thermal expansion of the stator 69 takes place. The O-rings 79 and 80 expand or contract following any change in the clearance 78 due to thermal expansion of the stator 69 to thereby completely prevent any leakage of the cooling liquid through the clearance 78. The stator 69 can be held in its coaxial position with respect to the rotor 23 by means of support faces 81, 82 and 83 as shown in FIG. 6, and since bolt holes 84 and 85 for the respective bolts 70 and 72 securing the stator 69 to the end block 25 and to the slidable conductive ring 71 have a larger diameter than that of the bolts 70 and 72, no thermal stress will be imparted to the bolts 70 and 72, the end bracket 25 and the conductive ring 71 and the safety against breakage can thus be ensured. Further, any thermal stress caused by axial thermal expansion of the stator 69 can be dealt with by the sliding movement of the conductive ring 71 along the support face 83, and the O-rings 79 and 80 insure tight seal against leakage of the cooling liquid.

The end bracket 25, the conductive ring 71 or like element may be castings of highly conductive material such as aluminum or a copper alloy so that the eddy current flowing through the stator 69 can be increased to produce a greater braking force. Further, it will be understood that not only the cooling fins 73 and 74 can effectively cause the thermal energy produced in the stator 69 to dissipate into the cooling liquid but also the cooling fins 73 and 74 cooled by the cooling liquid can suppress the stator 69 tending to expand for thereby preventing any expansive deformation of the stator 69. Since moreover a portion of magnetic flux 87 of all the magnetic flux 86 passing through the magnetic poles 21 passes through the cooling fins 73 and 74 as shown in FIG. 5, it is possible to increase the total magnetic flux passing through the stator 69 and to thereby increase the braking force.

Figure 7:
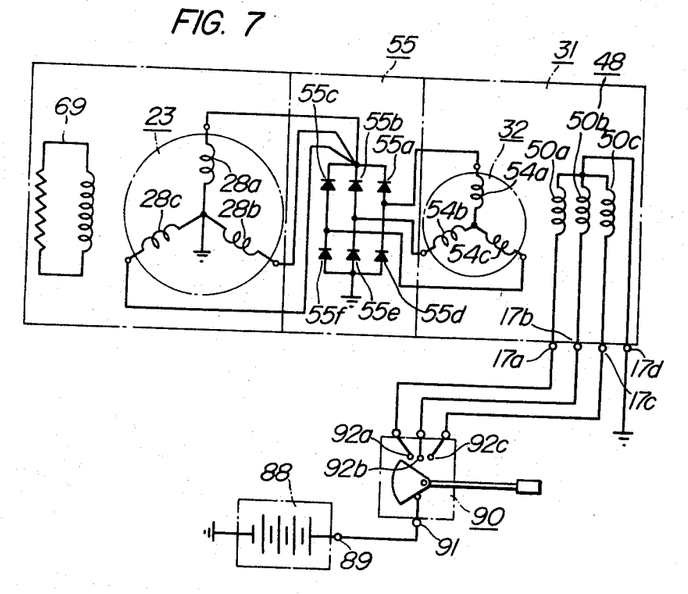
FIG. 7 is an electrical connection diagram of the embodiment of the inventive apparatus shown in FIG. 2.

An electrical connection diagram of the apparatus according to the invention is shown in FIG. 7. A battery 88 mounted on the automotive vehicle 2 has one terminal thereof grounded as shown, while the other terminal 89 thereof is connected to a terminal 91 of a manual control switch 90. Notches 92a, 92b and 92c of the control switch 90 are connected to the respective terminals 17a, 17b and 17c of the field system 48 of the AC generator 31. The terminals 17a, 17b and 17c are connected to respective field coils 50a, 50b and 50c which are grounded through a terminal 17d. AC voltage induced in the power generating coils 54 of the armature 32 of the three-phase AC generator 31 is subjected to full-wave rectification by semiconductor rectifiers 55a, 55b . . . 55f from which the direct current is supplied to the exciting coils 28a, 28b and 28c of the rotor 23. By the supply of the exciting current to the exciting coils 28, an eddy current is induced in an equivalent circuit of the stator 69 and is converted into thermal energy by the resistance of the stator 69.

Figure 8:
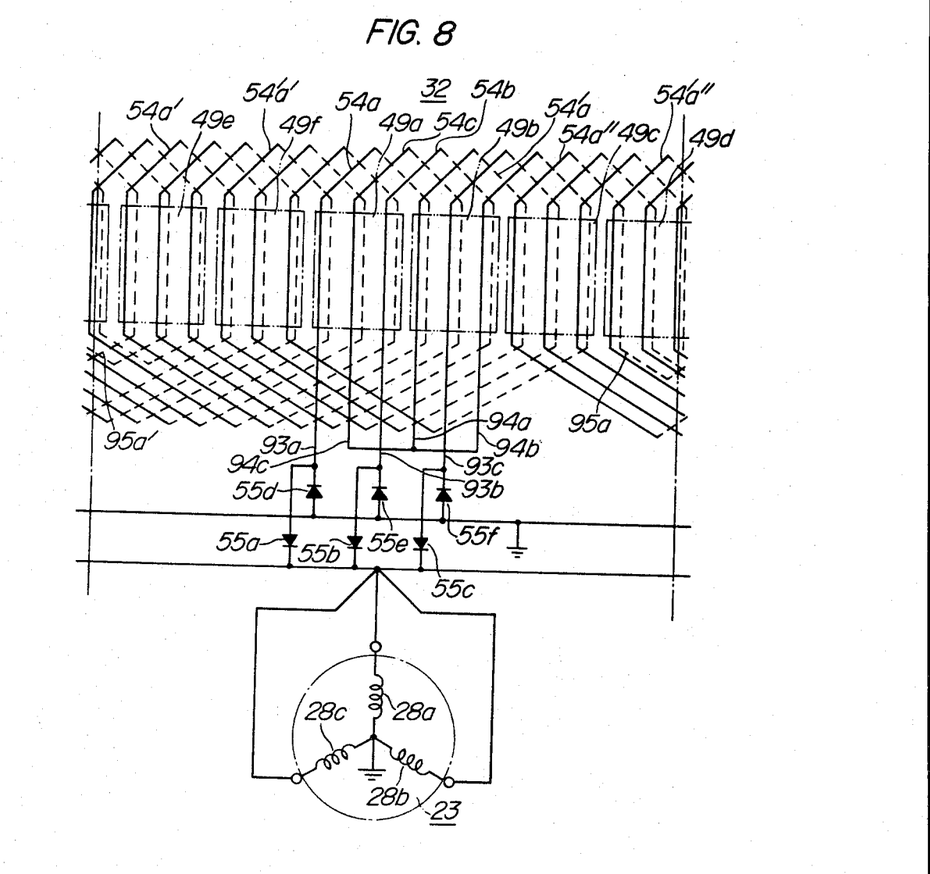
FIG. 8 is a developed view of armature coils of an electric generator incorporated in the apparatus.

A detail view of the armature windings in the AC generator 31 is given in FIG. 8. Since this AC generator 31 is so arranged that the field poles are held stationary and the armature 32 is rotated unlike common AC generators, the end coil portions of the power generating coils 54 of the armature 32 must especially be made resistant against centrifugal force. To this end, the size of the end coils is minimized and connection between a coil and a next coil is also minimized.

Referring to FIG. 8, detailed explanation will be given with respect to a six-pole three-phase AC generator in which N and S field poles 49a, 49b . . . 49f are alternately arranged and the power generating coils 54a, 54b and 54c of the armature 32 are wound thereabout to form three-phase windings. In the present form of three-phase windings, 93a, 93b and 93c are tap wires of U-phase, V-phase and W-phase, respectively, and coil end portions 94a of U-phase, 94b of V-phase and 94c of W-phase are connected in star connection, with two coils received in each slot of the armature 32. However, these phases may be connected in delta connection. The manner of three-phase windings will be described with particular reference to U-phase. The U-phase winding extends from the U-phase tap wire 93a to the power generating coil 54a, thence extends in wave winding fashion through coils 54a′ and 54a″ to overlie the above-described power generating coil 54a. Suppose now the number of magnetic poles is 2P. Then, each coil group consists of those coils connecting P poles in series. More precisely, in the embodiment shown in FIG. 8, the first coil group consists of three coils 54a, 54a′ and 54a″. A tap wire 95a for the coil 54a″ is connected with a tap wire 95a′ for coil 54′a″ of the second coil group of U-phase consisting of coils 54′a, 54′a′ and 54′a″, and connection is made from the coil 54′a″ through 54′a′ and 54′a to the coil end portion 94a. The manner of winding for V-phase and W-phase is entirely similar to that of U-phase, and the power generating coils 54 are reinforced by binding wires.

It will be understood from the above description that the AC generator can be made small-sized since the coil tap wires for the power generating coils of the armature have a minimized number of connecting ends and the size of the end coil portions can be made extremely small with the result that the rotating armature can remarkably strongly withstand the centrifugal force imparted thereto due to rotation thereof. Thus, the output from the armature of the AC generator can be used as a source of high current supply required for the exciting coils. Therefore the battery may only supply that amount of power which is required to cause flow of the field current through the field coils of the AC generator and this amount of power is very small compared with the power required for supply to the exciting coils mounted on the rotor. This is remarkably advantageous for a power source for an automotive vehicle or the like whose capacity is quite limited.

A further advantage derivable from the inventive arrangement is that switch means of large capacity need not be provided and mere provision of a manual control switch of small capacity will suffice since a very small amount of power is required for the field coils. Another advantage is derivable from the fact that, during the low speed driving or stoppage of an automotive vehicle equipped with the inventive speed reduction apparatus, the armature will develop a very small amount of power or will not develop any power at all with the result that power consumption can greatly be curtailed compared with those in which power is directly supplied to exciting coils from batteries. No flow of current through the rotor as described above gives an additional advantage that unnecessary temperature rise in the exciting coils can be avoided to minimize degradation of insulation and to insure the stable braking action. A still further advantage derivable from the inventive apparatus with the built-in AC generator is that provision of slip rings or brushes involved in direct power supply or provision of a commutator and brushes involved in case of a built-in DC generator becomes utterly unnecessary and thus any possibility of occurrence of poor contact due to dust or the like can be eliminated.

Figure 9:
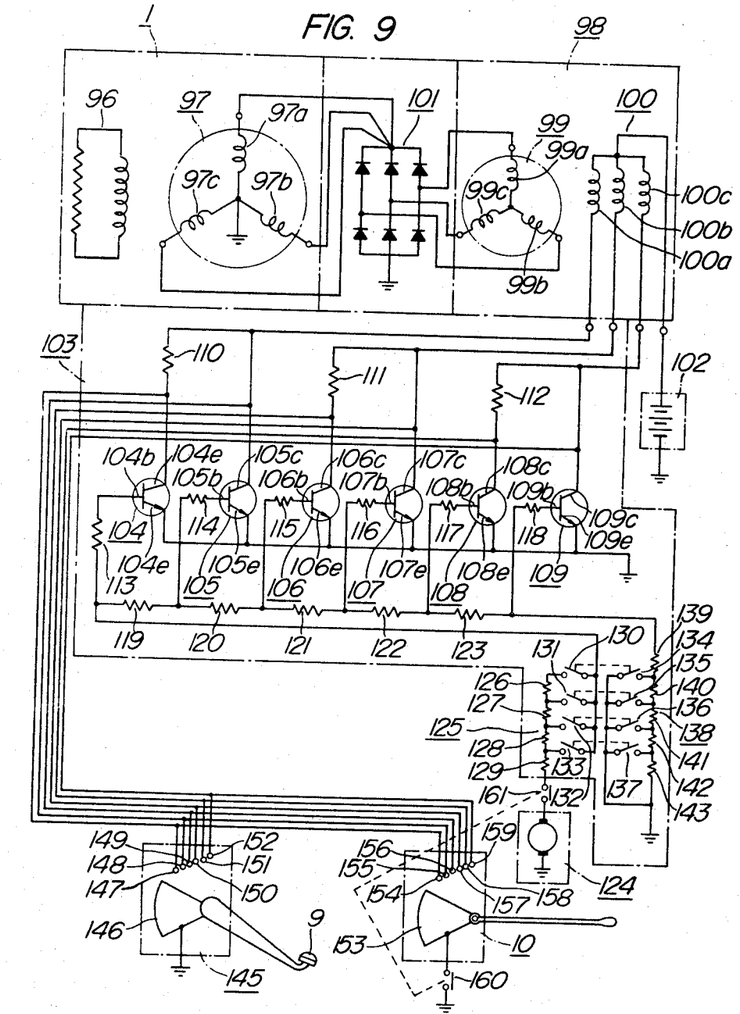
FIG. 9 is an electrical connection diagram of another embodiment according to the invention.

FIG. 9 is an electrical connection diagram showing another embodiment of the apparatus according to the invention. In FIG 9, the stator of the speed reduction apparatus is represented by an equivalent circuit 96 and is adapted to generate an eddy current by being excited by exciting coils 97. An AC generator 98 including therein power generating coils 99 and field coils 100 is built in the speed reduction apparatus 1. Power generating coils 99a, 99b and 99c have their one end connected in common and have the other end connected to a rectifier means 101. The output terminal of the rectifier means 101 is connected to exciting coils 97a, 97b and 97c. Field coils 100a, 100b and 100c of the generator 98 are connected at one end to a battery 102 mounted on the vehicle, and are grounded at the other end through the collectors and emitters of a plurality of transistors 104, 105, 106, 107, 108 and 109 in an automatic speed control means 103 in a manner as shown.

Field current control resistors 110, 111 and 112 are connected at one terminal to the collectors 104c, 106c and 108c of the respective transistors 104, 106 and 108, and are connected at the other terminal to the respective field coils 100a, 100b and 100c. Base resistances 113, 114 115, 116, 117 and 118 for the respective transistors 104

105, 106, 107, 108 and 109 are connected at one terminal to the respective bases 104b, 105b, 106b, 107b, 108b and 109b, and connected at the other terminal to respective junction points between series resistances 119, 120, 121, 122 and 123 interposed between the bases of the respective transistors.

An auxiliary generator 124 whose output is variable in proportion to the running speed of the vehicle is provided for the purpose of detecting the vehicle running speed. This auxiliary generator 124 is grounded at one terminal and the other terminal thereof is connected to the base resistance 113 of the transistor 104 through a first voltage dividing resistor 125 connected in series with the generator 124 and through a group of first set switches 130, 131, 132 and 133. The first voltage dividing resistor 125 consists of series resistor elements 126, 127, 128 and 129, and the first set switches 131, 132 and 133 are connectable with junction points between the respective resistor elements 126, 127, 128 and 129, with the first set switch 130 connectable with the end terminal of the resistor element 126. Second set switches 134, 135, 136 and 137 which are operative in interlocked relation with the respective first set swtiches 130, 131, 132 and 133 are grounded at one terminal thereof, and are connectable at the other terminal thereof to respective junction points of series resistor elements 139, 140, 141, 142 and 143 forming a second voltage dividing resistor 138. The second voltage dividing resistor 138 is grounded at one terminal thereof and the end terminal of the resistor element 139 of the resistor 138 is connected to the base resistance 118 of the transistor 109.

There is provided a foot switch 145 which is operative in interlocked relation with the foot brake pedal 9. A movable contact strip 146 of the foot switch 145 is grounded, and stationary contacts 147, 148, 149, 150, 151 and 152 disposed opposite the movable contact strip 146 are connected to the respective collectors 104c, 105c, 106c, 107c, 108c and 109c of the transistors. The manual control switch 10 is provided with a movable contact strip 153, and stationary contacts 154, 155, 156, 157, 158 and 159 disposed opposite this movable contact strip 153 are connected to the respective stationary contacts 147, 148, 149, 150, 151 and 152 of the foot switch 145. A changeover control switch 160 is grounded at one terminal thereof and the other terminal thereof is connected to the movable contact strip 153 of the manual control switch 10. This change-over control switch 160 is interlocked with a control switch 161 interposed between the output terminal of the auxiliary generator 124 and the first voltage dividing resistor 125 in such a way that, while one is open, the other is closed so that automatic or manual operation can freely be selected.

The speed reduction apparatus having the structure as described above operates in the following manner. When any desired pair of set switches in the automatic control means 103, say, the first set switch 131 and the second set switch 135 interlocked therewith are closed with the switch 161 also closed, output from the speed detection auxiliary generator 124 causes flow of current through a closed circuit consisting of the first voltage dividing resistor 125, first set switch 131, series resistances 119 to 123, second voltage dividing resistor 138 and second set switch 135. When a certain predetermined speed setting is exceeded, potential difference is developed across the junction points between the series resistances 119 to 123 and this potential difference drives the transistor 104 to its conducting state. As a result of conduction of the transistor 104, current from the battery 102 flows through the collector 104c and emitter 104e of the transistor 104, and field current is supplied to the field coil 100a of the AC generator 98. This flow of field current generates voltage across the power generating coils 99 and exciting current is supplied through the rectifier means 101 to the exciting coils 97 so that the speed reduction apparatus 1 starts its decelerating action. Thus the conduction of the transistor 104 causes reduction of the travelling speed of the vehicle. When, however, the acceleration of the vehicle overcomes the decelerating action by the speed reduction apparatus 1, a further greater voltage is generated by the speed detection auxiliary generator 124 to cause a greater voltage drop across the series resistances 119 to 123, and potential difference across the junction points of these series resistances now drives the transistor 105, connected in parallel with the transistor 104, to its conducting state. Therefore, current flowing through the field coil 100a of the AC generator 98 is increased to increase the decelerating action by the speed reduction apparatus 1.

In case even with the above operation, the travelling speed of the vehicle is not reduced to a value below the predetermined speed setting, the operation similar to the above is repeated to successively drive the remaining transistors 106, 107, 108 and 109 to their conducting state to increase the decelerating action by the speed reduction apparatus 1. When the travelling speed of the vehicle is lowered to a value below its predetermined setting, that is, the vehicle moves down to a flat road, less power is generated by the speed detection auxiliary generator 124, with the result that potential difference across the junction points of the series resistances 119 to 123 is lowered and the transistors 109 to 104 are successively rendered non-conducting. Consequently, less field current flows through the field coils 100a, 100b and 100c of the AC generator 98 to generate less voltage across the power generating coils 99. As the exciting current flowing through the exciting coils 97 of the speed reduction apparatus 1 is correspondingly decreased, the decelerating action by the speed reduction apparatus 1 is gradually reduced.

The foot switch 145 interlocked with the foot brake pedal 9 is operative to control the decelerating action of the speed reduction apparatus 1 independently of the conduction or non-conduction of the transistors in the automatic control means 103. When the foot switch 145 is actuated so that the movable contact strip 146 is moved to a position at which it contacts the stationary contact 147, current from the battery 102 is supplied to the field coil 100a as in the case of conduction of the transistor 104 and voltage is generated across the power generating coils 99 of the AC generator 98. Where the acceleration of the vehicle still overcomes the decelerating action by the speed reduction apparatus 1, the movable contact strip 146 may be further rotated to be successively brought into contact with the stationary contacts 148, 149, 150, 151 and 152 for thereby increasing the field current flowing through the field coils 100a, 100b and 100c of the AC generator 98. This increase in the field current increases the decelerating action by the speed reduction apparatus 1 and thus any desired deceleration can be attained. By arranging in a manner that the foot brake starts to operate after the movable contact strip 146 of the foot switch 145 is brought into contact with the stationary contacts 147 to 152, the greater part of deceleration is effected by the action of the speed reduction apparatus 1 and the foot brake may hardly be put into operation. This manner of deceleration is quite advantageous in that the foot brake can be protected against excessive wear and its service life can be extended. It will be recalled that the speed reduction apparatus 1 can also be placed in operation by setting the change-over switch 160 in its closed position and driving the movable contact strip 153 of the manual control switch 10. Since, at the closed position of the change-over switch 160, the other change-over switch 161 disposed at the output side of the auxiliary generator 124 associated with the automatic control means 103 is kept in its open position, the transistor circuit is rendered inoperative and the speed reduction apparatus 1 can manually be controlled.

It will be understood from the foregoing description that, in the apparatus of the invention, any desired pair of set switches in the automatic control means 103 may be actuated to set the vehicle speed at a desired value, and voltage generated by the speed detection auxiliary generator 124 is utilized to control the base current of the transistors through the series resistances so as to keep the vehicle speed within the desired setting, and the collector current of these transistors is uilized to automatically control the field current to be supplied to the AC generator built in the apparatus. Therefore, deceleration of vehicle speed can be attained without frequent use of the foot brake and other brake means. Provision of the manual control switch and the foot switch interlocked with the foot brake pedal gives and additional advantage that an abrupt brake action can be imparted independently of a conducting or non-conducting state of the transistors. The invention apparatus has many remarkable effects that it protects and prolongs the service life of the foot brake and the like by reducing the frequency of actuation of such brake means and safe drive can always be ensured.

Prominent characteristics of the speed reduction apparatus according to the invention will be described hereunder with reference to FIGS. 10 to 14.

Figure 10:
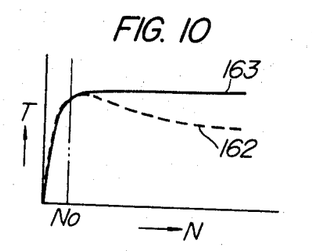
FIG. 10 is a graphic representation of the relation between braking torque and the number of revolutions.

A curve 162 in FIG. 10 represents the braking torque characteristic relative to the number of revolutions in a prior eddy current type of speed reduction apparatus. Exciting current in this case is direct current $I_0$ which is constant relative to the number of revolutions N as shown by a dotted line in FIG. 11. In the prior braking torque characteristic, therefore, the braking torque T increases as the number of revolutions N increases from zero, and becomes maximum at a certain number of revolutions, then decreases as the N further increases.

Figure 11:
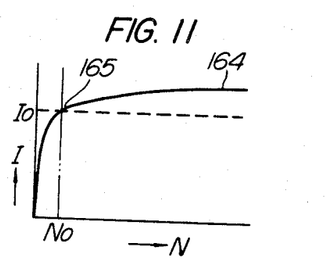
FIG. 11 is a graphic representation of the relation between exciting current and the number of revolutions.

The present invention takes advantage of the fact that the output current characteristic of an AC generator is variable relative to the number of revolutions N so as to obtain an exciting current I which increases with the increase in the number of revolutions N in a manner as shown by a curve 164 in FIG. 11. According to the invention, therefore, the above-descrcibed prior drawback of reduction in the braking torque T with the increase in the number of revolutions N can be eliminated and the braking torque T is not reduced as shown by a characteristic curve 163 in FIG. 10. More precisely, by arranging in such a way that a point 165 in FIG. 11 at which the rising curve of AC generator output current is abruptly slowed down comes near the number of revolutions $N_0$ corresponding substantially to the maximum braking torque of the prior characteristic curve 162 in FIG. 10, the AC generator output makes a gradual increase as the number of revolutions N increases past the value $N_0$, with the result that the magnetomotive force of the exciting coils in the eddy current type of speed reduction apparaus 1 is gradually increased and the braking torque T shows the stable characteristic as shown by the curve 163 in FIG. 10.

An advantage will be derivable by stabilizing the AC generator so that the rated current $I_0$ is developed at the number of revolutions $N_0$. By so arranging, the armature of the generator and the rotor will rotate at a larger number of revolutions when the number of revolutions N exceeds $N_0$ and the exciting current I exceeds $I_0$ in a manner as shown by the characteristics curve 164 in FIG. 11. Since a greater air cooling effect for the power generating coils and the exciting coils can thereby be obtained and no temperature rise takes place, a similar effect with a substantially small-sized braking apparatus of eddy current type can be obtained and the braking apparatus can be manufactured at low cost. Excitation by means of the AC generator gives an additional advantage that, even when current is supplied to the field coils during the inoperative state of the apparatus, no current flows through the exciting coils and the power generating coils and no temperature rise occurs in these coils. A further advantage is that the apparatus consumes a small current and any extra power will not be consumed compared with those apparatus in which direct current is directly supplied to exciting coils because a very small current flows through the field coils.

Figure 12:
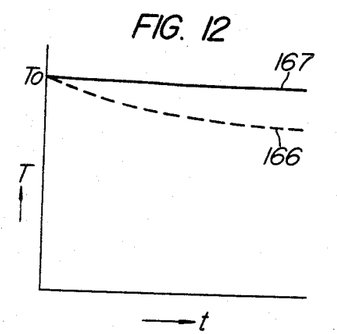
FIG. 12 is a graphic representation of a manner of variation of braking torque relative to a driving time.
Figure 13:
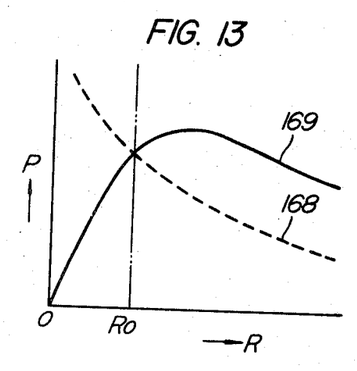
FIG. 13 is a graphic representation of a manner of variation of load resistance relative to electric generator output.

FIG. 12 shows variation of the braking torque T of the inventive apparatus relative to a driving time $t$. In FIG. 12, curves 166 and 167 represent the prior braking torque characteristic and the braking torque characteristic in the speed reduction apparatus according to the invention, respectively, and $T_0$ represents the value of braking torque T at the beginning of drive. These braking torque characteristics as represented by the curves 166 and 167 will be explained in more detail with reference to FIG. 13 which shows variation of power consumption relative to load resistance. Suppose now the wire diameter of the exciting coils is varied so as to increase the load resistance value R successively from zero ohm, power consumption P with the prior constant voltage source will be represented by a curve 168, while power consumption with the AC generator in the inventive apparatus will be represented by a curve 169 as shown in FIG. 13. More precisely, the power consumption P is expressed by an equation $P=E^2/R$ when a constant voltage source at voltage E is employed and power consumption in this case will be inversely proportional to the load resistance R as shown by the curve 168 in FIG. 13. In contrast thereto, the output of the AC generator in the inventive apparatus relative to variation of the load resistance R generally varies in a manner as shown by the curve 169 in FIG. 13.

Figure 14:
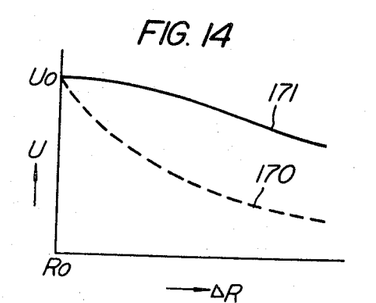
FIG. 14 is a graphic representation of the relation between magnetomotive force of the exciting coils and coil resistance.

The AC generator may therefore be designed in such a way that the characteristic curve 169 intersects the characteristic curve 168 at a resistance value $R_0$ which is lower than the maximum value of R corresponding to the peak of the curve 169. Suppose now this resistance $R_0$ is taken as coil resistance of the exciting coil at room temperature and $U_0$ is magnetomotive force of the exciting coil corresponding to the coil resistance $R_0$, while the number of turns of the exciting coil is $n$. Then the magnetomotive force U is given by an equation $U=nI=n\sqrt{P/R}$, and the magnetomotive force with the prior constant voltage source will be represented by a characteristic curve 170, while the magnetomotive force in the inventive apparatus will be represented by a characteristic curve 171 as shown in FIG. 14, in which the magnetomotive force U is plotted against variation of minute resistance $\Delta R$ in the vicinity of the resistance value $R_0$. This difference results from the fact that the power consumption P represented by the characteristic curve 169 increases up to a maximum and then decreases, whereas the power consumption P represented by the characteristic curve 168 abruptly decreases when the resistance R exceeds $R_0$. When therefore current is supplied to the exciting coils of the apparatus and the apparatus is driven for a time $t$ as shown in FIG. 12, temperature rise in the exciting coil causes an increase in the coil resistance $R_0$ with the result that the magnetomotive force U varies in a manner as shown in FIG. 14. It will be seen that the braking torque characteristics as shown by the curves 166 and 167 in FIG. 12 are derived from the magnetomotive force characteristics as shown by the curves 170 and 171 in FIG. 14, respectively. As will be apparent from the above description, the braking torque T decreases very little as shown by the curve 167 in case of excitation by the AC generator in the inventive apparatus, whereas the braking torque T decreases to a great degree relative to time $t$ as shown by the curve 166 in FIG. 12 in case of excitation by the prior constant voltage source.

It will be understood that provision of the cooling fins on the outer peripheral portion of the stator in the speed reduction apparatus according to the invention gives many advantages including an increased cooling effect on the stator whose temperature is caused to rise during the braking action, an increased mechanical strength, and a satisfactory braking effect due to the fact that these fins serve as a passage of magnetic flux produced by the exciting coils. The provision of the clearance between the stator and the casing and the provision of the slidable ring effectively absorb any thermal expansion of the stator due to its temperature rise caused by the braking energy and completely prevent any damage on the casing and other elements. The AC generator as a built-in exciting means gives an additional advantage that the eddy current type of speed reduction apparatus can function with a minimized exciting power, and the combination of this generator and the rectifier means eliminates any functional instability due to wear or lack of good contact and any mechanical instability due to intrusion of dust or water droplets. The AC generator as the built-in exciting means gives a further advantage that it effectively prevents any reduction of braking torque which tends to occur with the increase in the speed of rotation of the eddy current type of speed reduction apparatus.

What is claimed is:

1. A speed reduction apparatus for automotive vehicles comprising an outer casing secured to a stationary portion of the vehicle body, a rotary shaft extending through said casing and connected with the propeller shaft of the vehicle, a rotor mounted on said rotary shaft for unitary rotation therewith and having exciting coils of braking means fixedly mounted thereon and power generating coils of an AC generator, said AC generator having its field coils disposed opposite said power generating coils on said rotor, a stator disposed in said casing in a manner to be concentrically opposed in suitably spaced relation by said rotor and said casing so that magnetomotive force generated in said exciting coils of said braking means can produce an eddy current on that face portion of said stator which is opposite to said rotor, means for connecting said field coils of said AC generator to a battery through switch means, and means for connecting the output terminals of said power generating coils of said AC generator to said exciting coils of said braking means through rectifier means.

2. A speed reduction apparatus for automotive vehicles comprising an outer casing secured to a stationary portion of the vehicle body, a rotary shaft extending through said casing and connected with the propeller shaft of the vehicle, a rotor mounted on said rotary shaft for unitary rotation therewith and having exciting coils of braking means fixedly mounted thereon and power generating coils of an AC generator, said AC generator having its field coils disposed opposite said power generating coils on said rotor, a stator disposed in said casing in a manner to be concentrically opposed in suitably spaced relation by said rotor and said casing so that magnetomotive force generated in said exciting coils of said braking means can produce an eddy current on that face portion of said stator which is opposite to said rotor, an auxiliary generator for speed detection whose output is variable in proportion to vehicle speed, automatic control means including a plurality of transistors whose conducting state is controlled by the output of said auxiliary generator, means for connecting said field coils of said AC generator to a battery through the collector circuit of said transistors in said automatic control means, and means for connecting the output terminals of said power generating coils of said AC generator to said exciting coils of said braking means through rectifier means.

3. A speed reduction apparatus according to claim 1, which is provided with a cooling system including a cooling liquid passage defined between said casing and the outer periphery of said stator internally opposed by said rotor so as to allow for passage of a cooling liquid therethrough, and a plurality of cooling fins extending from said stator into said cooling liquid passage, in which said rotor has one of its axial ends fixed to said outer casing and the other axial end thereof arranged to be slidable along the inside face of said outer casing, and in which the annular space portions between said outer casing and the opposite axial end portions of said stator are sealed by O-rings.

4. A speed reduction apparatus according to claim 2, which is provided with a cooling system including a cooling liquid passage defined between said casing and the outer periphery of said stator internally opposed by said rotor so as to allow for passage of a cooling liquid therethrough, and a plurality of cooling fins extending from said stator into said cooling liquid passage, in which said rotor has one of its axial ends fixed to said outer casing and the other axial end thereof arranged to be slidable along the inside face of said outer casing, and in which the annular space portions between said outer casing and the opposite axial end portions of said stator are sealed by O-rings.

References Cited

UNITED STATES PATENTS 3,184,626   5/1965   Luenberger __________ 310—96

J. D. MILLER, *Primary Examiner.*

G. NUNEZ, *Assistant Examiner.*

U.S. Cl. X.R.

310—95, 102, 105